United States Patent [19]
Lewis et al.

[11] Patent Number: 6,092,668
[45] Date of Patent: *Jul. 25, 2000

[54] LITTER SCREENING MACHINE

[75] Inventors: Robert L. Lewis; Carl J. Thomas, both of Baxley, Ga.

[73] Assignee: Lewis Bros. Mfg., L.L.C., Baxley, Ga.

[*] Notice: This patent issued on a continued prosecution application filed under 37 CFR 1.53(d), and is subject to the twenty year patent term provisions of 35 U.S.C. 154(a)(2).

[21] Appl. No.: 09/016,394

[22] Filed: Jan. 30, 1998

[51] Int. Cl.⁷ ....................................................... B07B 1/00
[52] U.S. Cl. ........................ 209/235; 209/308; 209/381; 209/399; 209/420; 198/360; 198/580
[58] Field of Search ..................... 198/360, 580; 209/235, 241, 308, 381, 399, 420, 247, 256, 261

[56] References Cited

U.S. PATENT DOCUMENTS

| | | | |
|---|---|---|---|
| 92,245 | 7/1869 | Averill | 209/247 |
| 735,057 | 8/1903 | Blaisdell | 209/399 |
| 946,185 | 1/1910 | Williamson | 209/399 |
| 2,595,392 | 5/1952 | Lalancette | |
| 2,674,381 | 4/1954 | Cady | 198/580 |
| 3,331,487 | 7/1967 | Willoughby | 198/360 |
| 3,412,943 | 11/1968 | Lewis et al. | 198/518 |
| 4,143,759 | 3/1979 | Paradis | |
| 4,711,403 | 12/1987 | Gregory, Sr. et al. | |
| 4,741,431 | 5/1988 | Whitehead | 198/844 |
| 4,897,183 | 1/1990 | Lewis, Jr. et al. | |

*Primary Examiner*—Christopher P. Ellis
*Assistant Examiner*—Joe Dillon, Jr.
*Attorney, Agent, or Firm*—Shoemaker and Mattare, Ltd.

[57] ABSTRACT

A litter screening and separating machine including a storage compartment, a loader at one end of the storage compartment for picking up encrusted litter material from the floor of a chicken house, a conveyor including a pair of chains for moving the encrusted litter from the loader to the storage compartment. A baffle plate adjacent to and beneath the conveyor chain prevents contamination of the conveyor chain. Vibrator rollers adjacent the pair of chains for engagement with tabs on spaced links of each chain for vibrating the loading flights. Trap doors beneath the upper run of the conveyor may be opened to permit some of the material collected to fall back to the floor of the poultry house. One can regulate the amount of material thus recycled by independently opening and closing the trap doors.

7 Claims, 3 Drawing Sheets

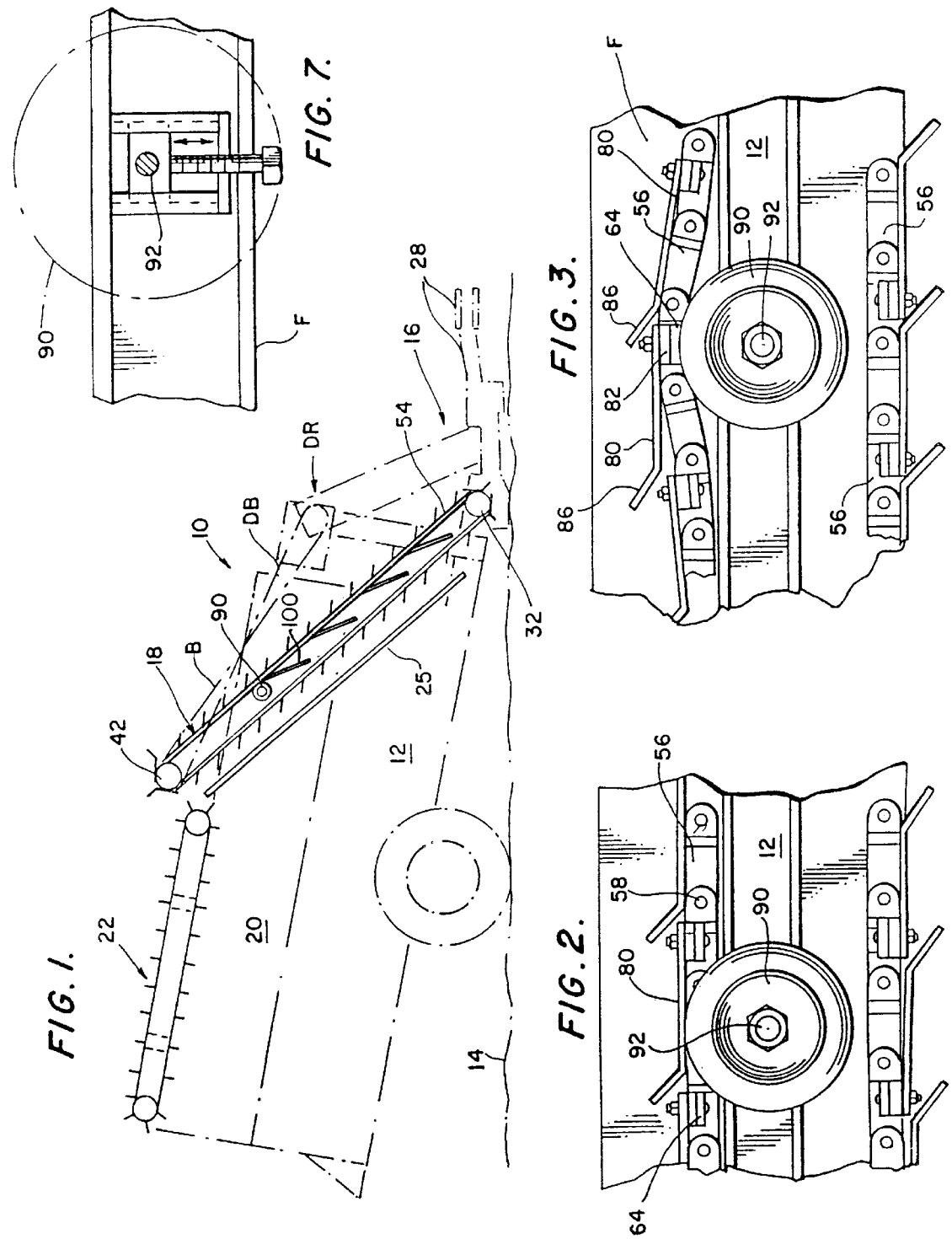

LITTER SCREENING MACHINE

BACKGROUND OF THE INVENTION

1. Field of the Invention

This invention relates generally to machines for loading and separating the litter bases normally found in poultry houses.

2. Description of the Prior Art

In the past, machines were employed to remove all of the litter from broiler houses after each batch of chickens reached their desired weight and were taken to market. Today, however, it is preferred to recondition and reuse the litter several times before it is completely removed.

A typical poultry house has a flat dirt floor on which about six inches of litter material, such as sawdust, wood shavings, rice hulls or cut wheat straw, is evenly distributed before starting the baby chicks on feed and water. After six to eight weeks of feeding and watering, the 20,000 to 40,000 birds in the house will have contaminated and encrusted the litter material. Near water fountains, the material is found to be particularly encrusted, because there, the water tends to mix water with the birds' droppings. Other areas, such as poorly drained portions of the floor, areas below roof leaks, and the like, may also experience excessive moisture which produces ammonia when mixed with the droppings and also is a haven for bacteria and disease.

In the past, the house was cleaned periodically by removing all the litter from the floor, and replacing it with fresh litter. In the interim, additional litter was added periodically, and the depth of accumulated used litter would raise the effective floor height substantially between cleanings. There was no practical way to remove only a fraction of the litter in the house, and thus reduce the rate of build-up.

The machine described in U.S. Pat. No. 4,897,183 enabled one for the first time to separate the waste portion of litter from the clean portion. That machine automatically loaded the waste portion into a storage or holding container, while returning the clean portion to the floor of the poultry house. It was provided with two sets of conveyor flights—one solid, one foraminous, to enable one to either pick up all the litter, or to allow part of it (the loose portion capable of passing through the holes in the flights) to return to the floor. Replacing all those flights, however, was a time-consuming chore, and did not allow one to adjust the amount of recycling, other than by alternating the flights in the series. It would have been better to give the operator of the machine the ability to adjust the recycling rate over a substantial range, and to do so quickly.

SUMMARY OF THE INVENTION

An object of the present invention is to provide a machine that will separate the hard crust and litter base in a poultry house and lift the wet material underneath the crust, then move the material along a separating path with a conveyor having foraminous plates thereon.

Another object of the present invention is to provide a structure for aerating picked up litter to get rid of the damp particles found in the litter.

A further object of the present invention is to provide a machine for separating dry litter material from material comprising hard and wet lumps, holding the latter, and letting the dry litter fall back to the floor of the chicken house.

A still further object of the present invention is to enable the operator of the machine to quickly and easily adjust the fractional amount of collected loose recycled litter back to the house floor.

These and other objects are met by a mobile litter screening and separating machine for engaging and lifting litter from the floor of a poultry house, as described in detail below. The machine has a scoop at its front for scooping up litter, and a storage compartment for receiving and storing litter collected by the scoop. An elevating conveyor having a lower end adjacent the scoop and a higher end adjacent the storage compartment includes a pair of parallel endless chains with a series of transverse flights affixed to the chains at close intervals along their lengths so as to provide a substantially continuous conveying surface through which fine material can fall. The improvement particularly comprises at least one trap door beneath the conveying surface for allowing a fraction of the fines to return to the floor, and means for controlling the position of the door so that one can adjust said fraction without having to replace any parts.

BRIEF DESCRIPTION OF THE DRAWINGS

FIG. 1 is a side elevational view of the self-loading litter screening and separating machine embodying the invention.

FIG. 2 is a fragmentary portion in side elevation and in enlarged detail of the conveyor vibrator roller structure.

FIG. 3 is a view similar to FIG. 2 showing how the vibrator roller effects vibration of the conveyor.

FIG. 7 is a detail of an adjustable roller mount.

DESCRIPTION OF THE PREFERRED EMBODIMENT

Figure 4:
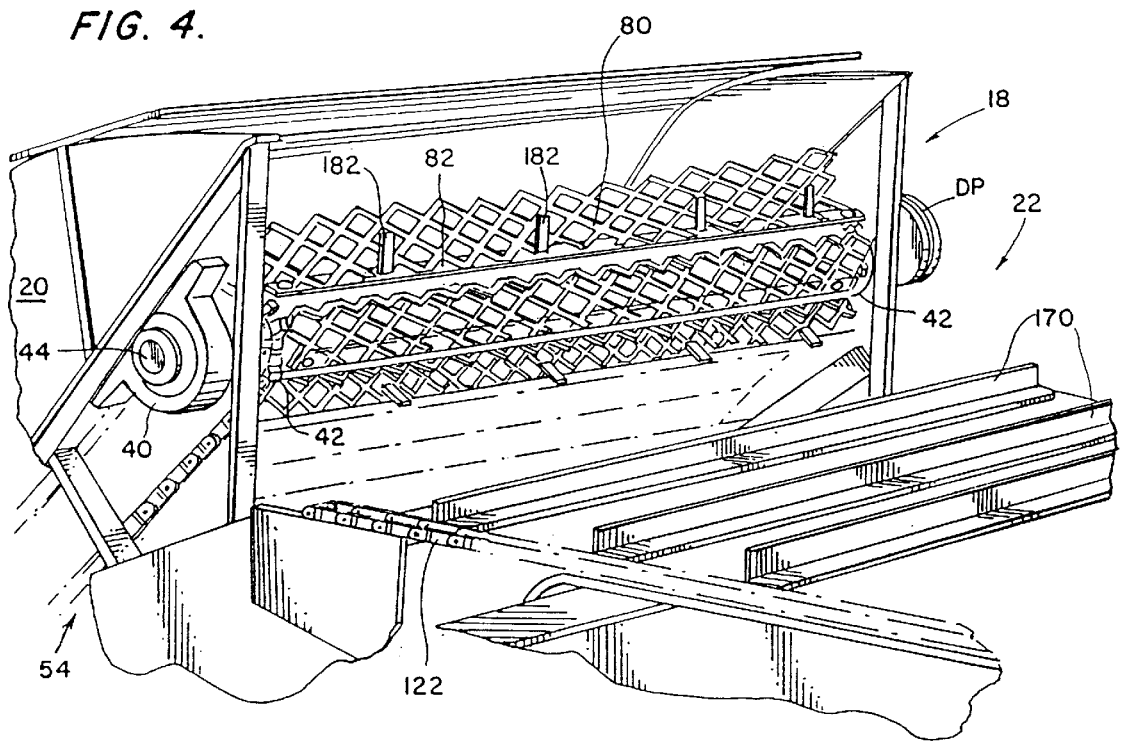
FIG. 4 is a perspective view of the upper portion of the conveyor mechanism of the litter screening and separating machine of the present invention.

Referring to FIG. 1 of the drawing, reference numeral 10 indicates in general the machine of the present invention. A storage compartment or hopper 12 is provided with scoop or loader 16 mounted on the front thereof for scraping and picking up encrusted litter material 14 from the floor of a poultry house. A conventional tow bar 28 is provided so that the machine can be moved across the floor of the poultry house. A primary conveyor 18 is mounted obliquely across the front of the machine and moves picked up litter material from the scoop or loader 16 at the front. Litter material is dumped into the upper storage compartment 20 through a horizontal and longitudinal conveyor 22 which receives waste material from the upper end of the primary conveyor 18. In some applications, however, the second conveyor 22 might be omitted, and the primary conveyor 18 arranged to deliver the litter directly into storage compartment 20.

A catch pan 25 is removably mounted close to the under-side of the primary conveyor 18. The purpose of this catch pan is to ensure that all the light litter material such as sawdust, wood shavings, rice hulls, cut wheat straw, or the like, after being separated and screened from the hard crusted waste material, are uniformly distributed back to the floor of the poultry house.

A pair of lower conveyor support sprockets 32 and a pair of upper support sprockets 42 provide support for the respective ends of the pair of conveyor chains 54. A drive belt DB between a drive pulley DP for the upper sprockets drive axle 44 and a drive DR provide the power for rotating the pair of conveyor chains. As best seen in the enlarged view of FIG. 4, the drive axle 44 for the sprockets 42 rotatably supports and drives the sprockets from the drive pulley DP at the one end thereof. Bearings 40 in turn appropriately support the respective ends of drive axle 44.

Figure 5:
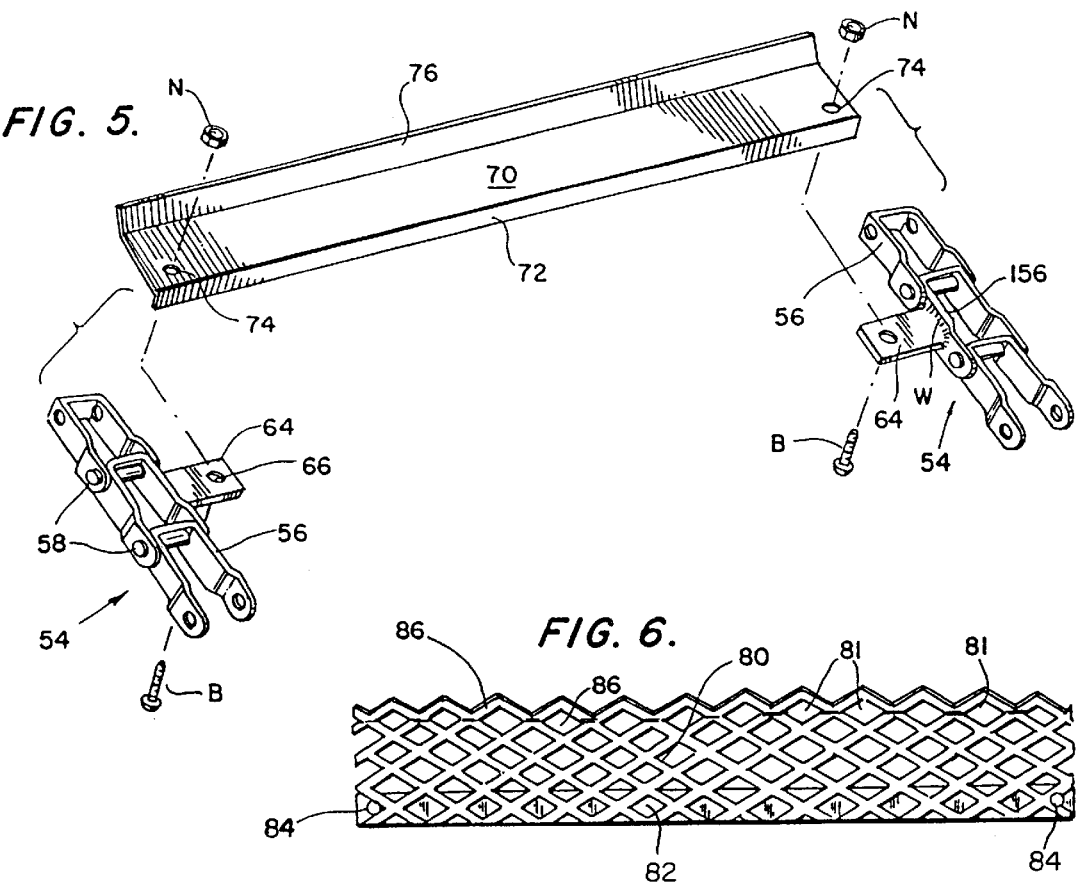
FIG. 5 shows a solid flight loaded for attachment to the side chains of the conveyor assembly.

FIG. 5 shows in detail the pair of conveyor chains 54. Each conveyor chain has a plurality of links 56 connected together with link pins 58. Provided on some of the links are tabs 64 welded W to a side link 156 thereof. Each tab 64 has an aperture 66 near the end thereof for securing and supporting the ends of one of a series of transverse flights, which are installed at intervals along the chains. The flights are secured to the chains by passing bolts B through the holes 66, 74 in the tabs and flights, respectively, and applying nuts N to the bolts.

As in U.S. Pat. No. 4,897,183, one may install flights of different types on the conveyor chains. Once the flights are installed, however, one may change the amount of material recycled simply by changing the position of the trap doors described below. It is no longer necessary to change parts to alter the recycling rate; however, one may extend the recycling rate range of the machine by refitting the machine with flights of a different configuration, if one so desires.

As shown in FIG. 5, a perforated lifting flight 70 has a downwardly turned reinforcing lip 72 at its leading edge and an upwardly angled lip 76 along its trailing edge. The purpose of the lip 76 is to prevent large pieces of encrusted litter material from rolling back to the pick-up point of conveyor 18 near the lower sprockets 32 as seen in FIG. 1.

Figure 6:
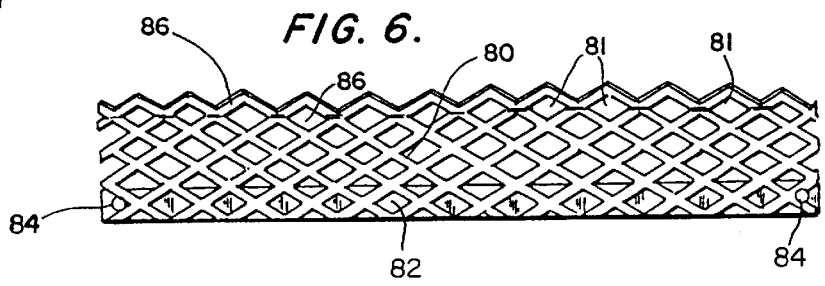
FIG. 6 shows the perforated flight like that depicted in FIG. 4.

We prefer that expanded metal flights (FIG. 6) also be used, to sift the litter, allowing at least some of the loose litter to be recycled. The expanded metal flights 80 have relatively large openings 81.

We prefer to interleave perforated flights with expanded metal flights, for example one perforated flight and four expanded metal flights in a repeating sequence. The best arrangement of flights may be determined experimentally.

In order to increase the sifting effectiveness of the flights as they carry litter upwardly along the upper surface of the conveyor, at least one vibrating roller 90 is provided underneath and adjacent each of the respective conveyor chains 54. Each vibrating roller 90 turns on an axle 92 mounted upon the side frames of the machine as shown in enlarged detail in FIGS. 2 and 3.

Preferably, either an adjustable mount or a movable mount is included for each roller so that the roller can be easily moved into operating position as desired. In FIG. 7, this adjustable mount comprises a channel member 93 in which a block 94 is adjustable by means of bolt 95. The axles 92 for the rollers 90 are carried by the block 94. Both FIGS. 2 and 3 show the roller in its operating position. FIG. 2 shows how the flat surface of the separating flights move along close to the circumferential edge of the roller 90. When the tabs 64 which support and hold the flight bar 82 move from the position of FIG. 2 to that of FIG. 3, the associated flight 80 is jarred and vibrated. Thus, as each respective flight moves into position adjacent shaker rollers 90, that flight will be vibrated or jostled. The axles 92 shown in these Figures rotatably support the rollers 90 thereon.

As best seen in FIG. 4, short perpendicular projecting members 182 are welded along the flight support bar 82 to help move larger lumps of caked litter upwards on the conveyor so that they do not continuously keep rolling or bouncing back down the conveyor.

Figure 8:
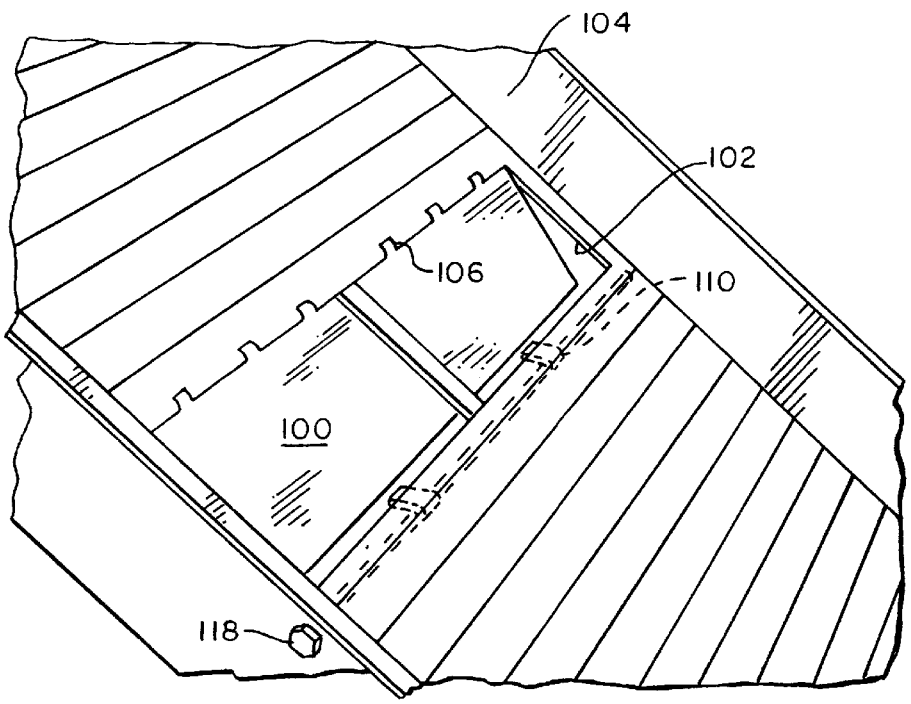
FIG. 8 is a perspective view, look diagonally downward, of a trap door beneath the elevating conveyor of the invention.
Figure 9:
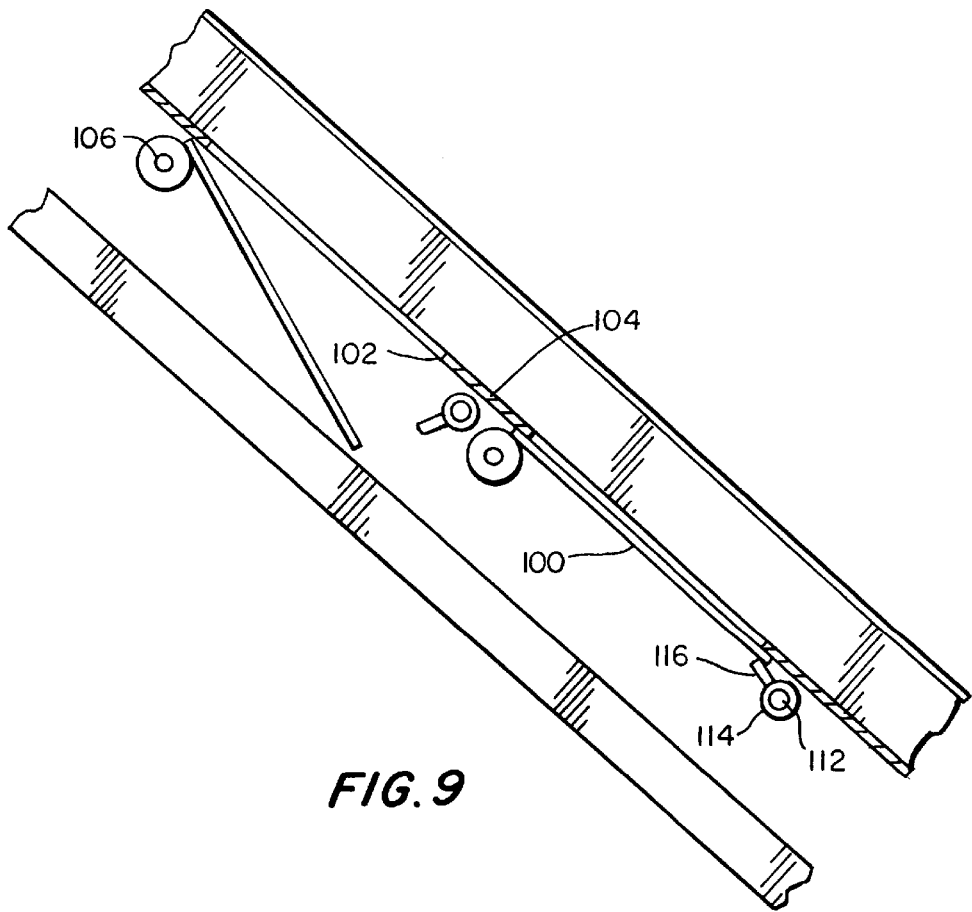
FIG. 9 is a simplified side elevation showing two trap doors for recycling litter, one open and one closed, and a mechanism for controlling the position of each door.

This invention is further distinguished from that disclosed in my prior patent by an adjustable litter recycling mechanism placed beneath the upper run of the conveyor. As one can see in FIGS. 1, 8 and 9, the mechanism includes four trap doors 100 mounted beneath an opening 102 in a steel sheet 104 which supports the upper run of the conveyor. Loose material smaller than the openings in the flights can escape through the trap doors, and fall back onto the floor of the poultry house. The remaining fraction of the litter is carried to the collection bin. By opening some or all of the doors, each of which is supported by a hinge 106 along its upper transverse edge, one can regulate the recycling rate.

The doors tend to open under their own weight; each is held closed by means of a cam 110 which can be manipulated from the side of the machine. Each cam comprises a shaft 112 extending parallel to the hinge 106 of the associated door 100. Each cam is supported in the machine within a sleeve 114 in such a way that it can be turned. The cam has one or more protrusions, such as tabs 116 welded to an extending radially outward from the shaft, that extend into the volume swept by the door as it opens, but the shaft of the cam is clear of the door's sweep. The door is held closed only when the tabs are in the position shown at the right, in FIG. 9. One can turn the cam from one side of the machine by applying a wrench to the nut 118 which is welded to the shaft at that end. Hairpin retainers (not shown) are inserted through aligned holes in the cam and its sleeve to prevent unintended movement of the cam after it is set.

The doors can be independently opened, so that one can control the amount of litter recycled. With all the doors closed, virtually all the litter is picked up from the floor. By opening the doors one at a time, one can recycle roughly 20%, 40%, 60% or 80% of the litter to the floor.

In operation, as the machine is towed around the floor of the poultry house, the front scoop breaks up and lifts the encrusted litter material. The pieces of litter move rearwardly onto the front of the primary conveyor of the machine. The flights of the primary conveyor elevate the litter, and pass over the openings 102 beneath which the trap doors 100 are positioned. When the doors are completely closed, no litter is permitted to escape, so the entire litter mass is collected. When the doors are open, depending on the number open, more or less loose litter is recycled to the floor. One can regulate the amount of recycling, thus permitting a greater or lesser fraction of the litter to be reused, simply by operating the trap doors. This is substantially easier than the previous expedient of replacing each of the expanded metal flights around the conveyor with other foraminous flights having openings of a different size.

Inasmuch as the invention is subject to variations and modifications, it is intended that the foregoing drawings and description be interpreted as merely illustrative of the invention defined by the following claims.

I claim:

1. In a mobile litter screening and separating machine for engaging and lifting litter from the floor of a poultry house, the machine having a scoop on a front portion thereof for scooping up litter, a storage compartment for receiving and storing litter collected by the scoop, and an elevating conveyor having a lower end adjacent the scoop and a higher end adjacent the storage compartment, the conveyor including a pair of parallel endless chains with a series of transverse flights affixed to the chains at close intervals along their lengths so as to provide a substantially continuous conveying surface through which fine material can fall the improvement comprising a litter barrier disposed below the conveyor flights along an upper run of the conveyor, at least one aperture in the barrier for permitting loose litter passing through or between the flights to return to the floor of the house, and at least one trap door movably positioned beneath a respective said aperture for allowing a fraction of the fines to return to the floor, and means for controlling the position of the door, whereby an operator can regulate flow of fines through the trap door.

2. The invention of claim 1, wherein the controlling means is a movable operator having a portion engaging said trap door.

3. The invention of claim 1, wherein the controlling means is a cam having a portion engaging said trap door.

4. The invention of claim 1, further comprising a hinge affixed to the barrier adjacent said aperture, said hinge being also connected to one edge of the trap door whereby the trap door can swing between closed and open positions.

5. The invention of claim 4, wherein said controlling means is a cam comprising a rotatable shaft extending along an axis parallel to said hinge and having at least one protuberance extending from the shaft for engaging a portion of the door.

6. The invention of claim 4, wherein said at least one trap door is a plurality of said trap doors, and further comprising a corresponding plurality of cams, one for controlling each door.

7. The invention of claim 6, wherein each of said cams has an end accessible from one side of the machine.

\* \* \* \* \*